United States Patent [19]

Ciraula et al.

[11] Patent Number: 5,710,731
[45] Date of Patent: Jan. 20, 1998

[54] COMBINED ADDER AND DECODER DIGITAL CIRCUIT

[75] Inventors: Michael Kevin Ciraula, Round Rock; Sang Hoo Dhong; Joel Abraham Silberman, both of Austin, all of Tex.

[73] Assignee: International Business Machines Corporation, Armonk, N.Y.

[21] Appl. No.: 646,194

[22] Filed: May 7, 1996

[51] Int. Cl.$^6$ ........................................... G06F 7/50
[52] U.S. Cl. .................................. 364/786.01
[58] Field of Search ................. 364/786, 715.01, 364/785, 784

[56] References Cited

U.S. PATENT DOCUMENTS 5,532,947  7/1996  Potter et al. ................ 364/715.01

Primary Examiner—Reba I. Elmore
Assistant Examiner—Monica Lewis
Attorney, Agent, or Firm—Whitham, Curtis, Whitham & McGinn; Robert P. Tassinari, Jr.

[57] ABSTRACT

An address used to access on-chip memory is calculated by summing two binary numbers to obtain an N-bit address. The N-bit address is decoded into a one-out-of-$2^N$ signal to select the addressed memory location. Instead of performing these operations sequentially, the addition and decoding are done at the same time, saving time and power and enabling changes to microprocessor organization and operation that enhance performance.

4 Claims, 4 Drawing Sheets

COMBINED ADDER AND DECODER DIGITAL CIRCUIT

BACKGROUND OF THE INVENTION

1. Field of the Invention

The present invention generally relates to address generators for on-chip cache memory in microprocessor architecture and, more particularly, to a combined adder and decoder circuit that performs addition and decoding at the same time.

2. Background Description

Two typical microprocessor instructions that require the addition of two binary numbers to generate an address are loads and relative branches. In the case of a load instruction, it might be necessary to add an offset to a value stored in a register. In the case of a relative branch instruction, the addition of an offset to the address of the branch instruction might be required. In both cases, current microprocessors devote one half to a full cycle for the addition that these address generation steps require. In a second cycle, the calculated address is then used to access the on-chip cache. The cache access always involves some method of decoding the address into a one-out-of-N signal to select a single word line or subportion of the full cache so as to obtain the information at the addressed location.

These two operations, addition and decoding, are done sequentially. This sequential operation is a potential bottleneck in high speed microprocessor operations. If the two operations could some how be combined, a significant improvement in microprocessor performance could be realized; however, the solution to this problem must be accomplished with a minimum amount of hardware to conserve silicon real estate of the microprocessor and minimize the cost.

SUMMARY OF THE INVENTION

It is therefore an object of the present invention to provide a combined adder and decoder circuit which accomplishes both operations in nearly the time required to do the decoding alone, resulting in a substantial time saving compared to performing the operations sequentially.

According to the present invention, two N-bit binary numbers are used as inputs to produce a decoded output corresponding to the sum of the two inputs. There are two fundamental parts to the operation of the combined adder and decoder according to the invention. The first is recognition that addition of two numbers can be accomplished by first decoding them, and then shifting the position of the active bit in one by the amount of the second addend. In decoded form, the value of a number is represented by the position of the active signal. For example, the numbers 0 to 3 (decimal) are represented in binary and decoded forms below:

| number | binary | decoded |
|---|---|---|
| 0 | 00 | 0001 |
| 1 | 01 | 0010 |
| 2 | 10 | 0100 |
| 3 | 11 | 1000 |

In the example above, the sum 2+1 can be represented by shifting the active bit in 0100 one position to the left to form 1000 or decimal 3.

While one could fully decode both N-bit inputs to form two $2^N$ bit signals and apply these to a general shifter, such an implementation would be extremely expensive. Instead, this invention includes a second key element that takes advantage of the natural tree organization of decoders.

Tree-based decoding schemes subdivide the initial N-bit input into several groups of a few adjacent bits. An 8-bit input might form four groups of two bits each, for example. The two bits are decoded into a one-of-four signal in each group. At the next level of the tree, two one-of-four groups are logically ANDed in all bit combinations to generate a one-of-sixteen signal corresponding to full decoding of the four input bits. This procedure of combining outputs is continued until the fully decoded signal is obtained.

To realize an N-bit adder that generates the decoded form of the N-bit sum, the inputs are subdivided into groups and decoded in subgroups of bits. For example, pairs of bits in each addend are decoded to a one-of-four signal. These are then applied to a shifter to form the decoded form of the sum of the bits in each subgroup. The possibility always exists that the addition of the bits in the subgroup produces a carry that must be added to the next higher subgroup.

The method of including the carry information consists of extending the shifter used to form the sum for each bit group so that circular shifting (which corresponds to generation of a carry out) does not occur. Thus when, for example, 0100 (decimal 2) is shifted by 1000 (decimal 3), the result becomes 00100000 (decimal 5) instead of 0010 (decimal 1=5 modulo 4) with a carry. In effect, the extended form of the output can be thought of as having two halves; the decoded form of the sum is in the upper half if a carry is generated and in the lower half if there is no carry. In the above example, the result can be thought of as (0010) (0000), i.e., decimal 1 with a carry. In this way logic to specifically detect the generation of a carry is eliminated.

The carry information is then used to correct the sum in the next higher bit group simultaneously with further decoding. Specifically, to complete the decoding in the absence of a carry, each bit from the higher group's decoded output is normally ANDed with each bit from the lower one. For example, if the two groups gave 0010 and 0100, the further decoding would compute 0 AND 0100, 0 AND 0100, 1 AND 0100, and 0 AND 0100 to give the sixteen bit output (0000) (0000) (0100) (0000). In the case where the lower bit group generates a carry, the upper group must normally be shifted by one before the ANDing takes place. But shifting a bit into position N before ANDing is equivalent to ANDing with the bit in position N+1. Use of the carry-extended decoded output automatically selects the upper group bit at position N (in the case of no carry) or N+1 (in the case of a carry) for ANDing to complete the decoding. With the indicated carry-extended decoded form, this ANDing occurs as usual with the bits in the lower half of the extended encoding (corresponding to no carry)., and this must be ORed with the result of ANDing upper group bit N+1 with the top half of the extended code.

By way of illustration, assuming in the above example that the lower group sum was 0100 but also generated a carry, the carry-extended output would be (0100) (0000). The decoder must now combine 0010 from the upper group with (0100) (0000) from the lower one. The circuit now implements (0 AND 0000) OR (0 AND 0100), (0 AND 0000) OR (1 AND 0100), (1 AND 0000) OR (0 AND 0100), (0 AND 000) OR (0 AND 0100) to give the 16-bit output in this case of (0000) (0100) (0000) (0000). Note that the same result would have been obtained by incrementing the upper group sum from 0010 to 0100 to account for a carry and combining this in the decoder with 0100 from the lower group. It is the use of the extended decoding to represent a generated carry that permits correction for a carry and further decoding to be combined. This realization constitutes the second element that allows combination of adder and decoder and reduces the overall delay.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
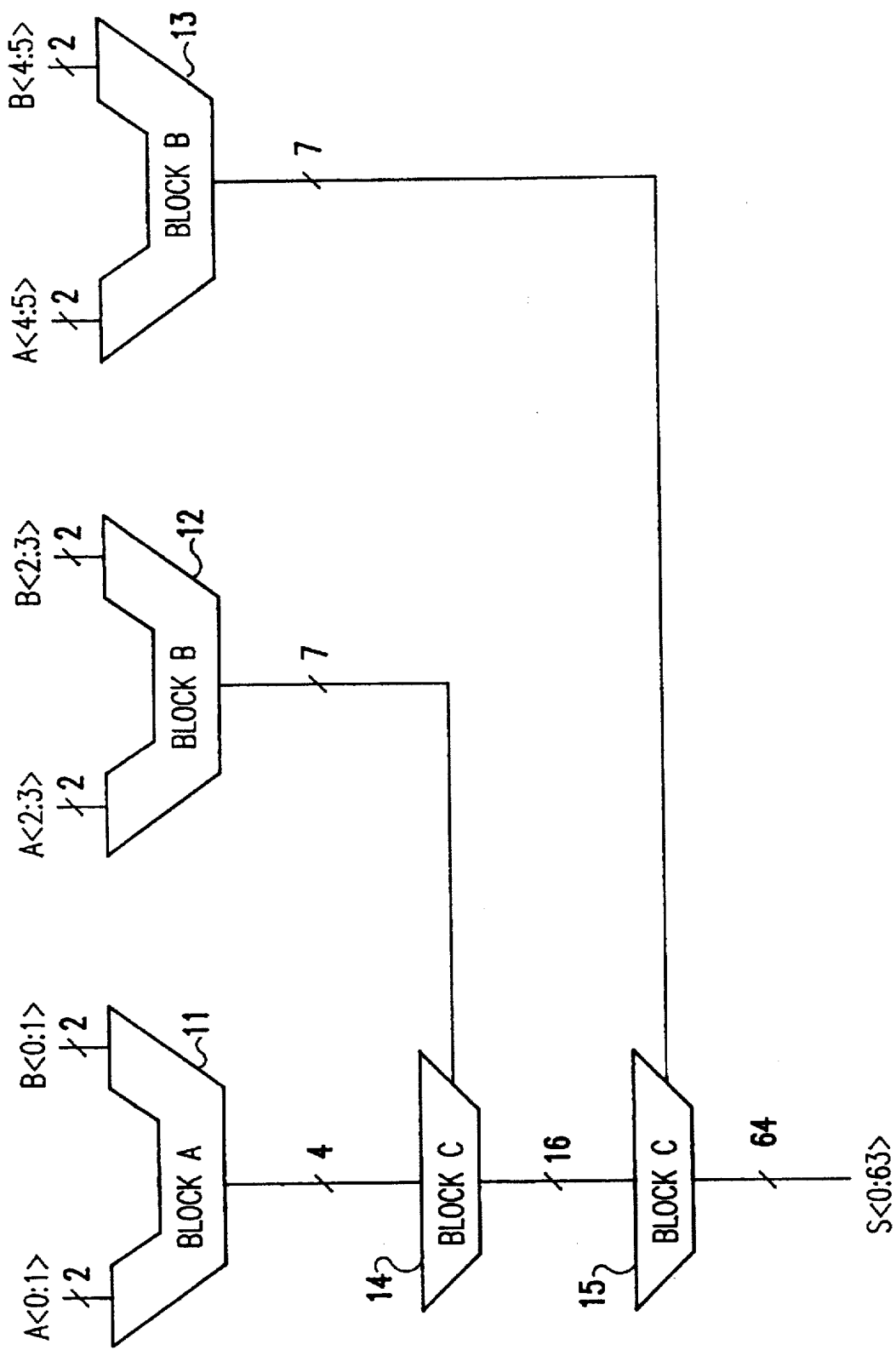
FIG. 1 is a block diagram of a six-bit add/decode logic illustrating the principle of operation of the invention.

Referring now to the drawings, and more particularly to FIG. 1, there is shown by way of example a 6-bit add/decode block diagram implementing the invention. As may be seen from the general form of the circuit, it is very much like a tree decoder in which the original six bits of the two operands A and B are divided into three groups of two bits each and the tree decoder outputs a one-of-sixty-four output signal. This example of the invention was incorporated into the design of an adder/decoder used to make a 16-kilobyte four-way set associative cache memory. One adder/decoder computes the sum of six bits while decoding into one-of-sixty-four form for word line selection. A second adder/decoder computes the sum of a second set of six bit inputs to generate an odd/even word line selection signal and a one-of thirty-two byte enable signal. With this adder/decoder, the cache address generation and access are accomplished in 3.1 ns.

In FIG. 1, the two operands A and B are divided into three groups of two bits each denoted A<0:1>, A<2:3>, A<4:5>, and B<0:1>, B<2:3>, B<4:5>, respectively, where "0" represents the most significant bit (MSB) and "5" represents the least significant bit (LSB) of the 6-bit operands. The first groups of the two operands are applied to Block A logic 11, the second groups of the two operands are applied to Block B logic 12, and the third groups of the two operands are applied to Block B logic 13. The output of the Block A logic 11 is a one-of-four signals output corresponding to the decoded and added most significant two bits of the operands. The output of Block A logic 11 is input to Block C logic 14. The output of Block B logic 12 is a one-of-seven signals output corresponding to the carry-extended decoded and added middle two bits of the operands, and this output is also input to Block C logic 14. The output of the Block C logic 14 is a one-of-sixteen signals output which is input Block C logic 15. The output of Block B logic 13 is a one-of-seven signals output corresponding to the carry-extended decoded and added least significant two bits of the operands, and this output is also output to the Block C logic 15. The output of the Block C logic 15 is a one-of-sixty-four signals output which is the final added and decoded output used, in the specific implementation being described, to access the on-chip set associative cache memory.

Figure 2:
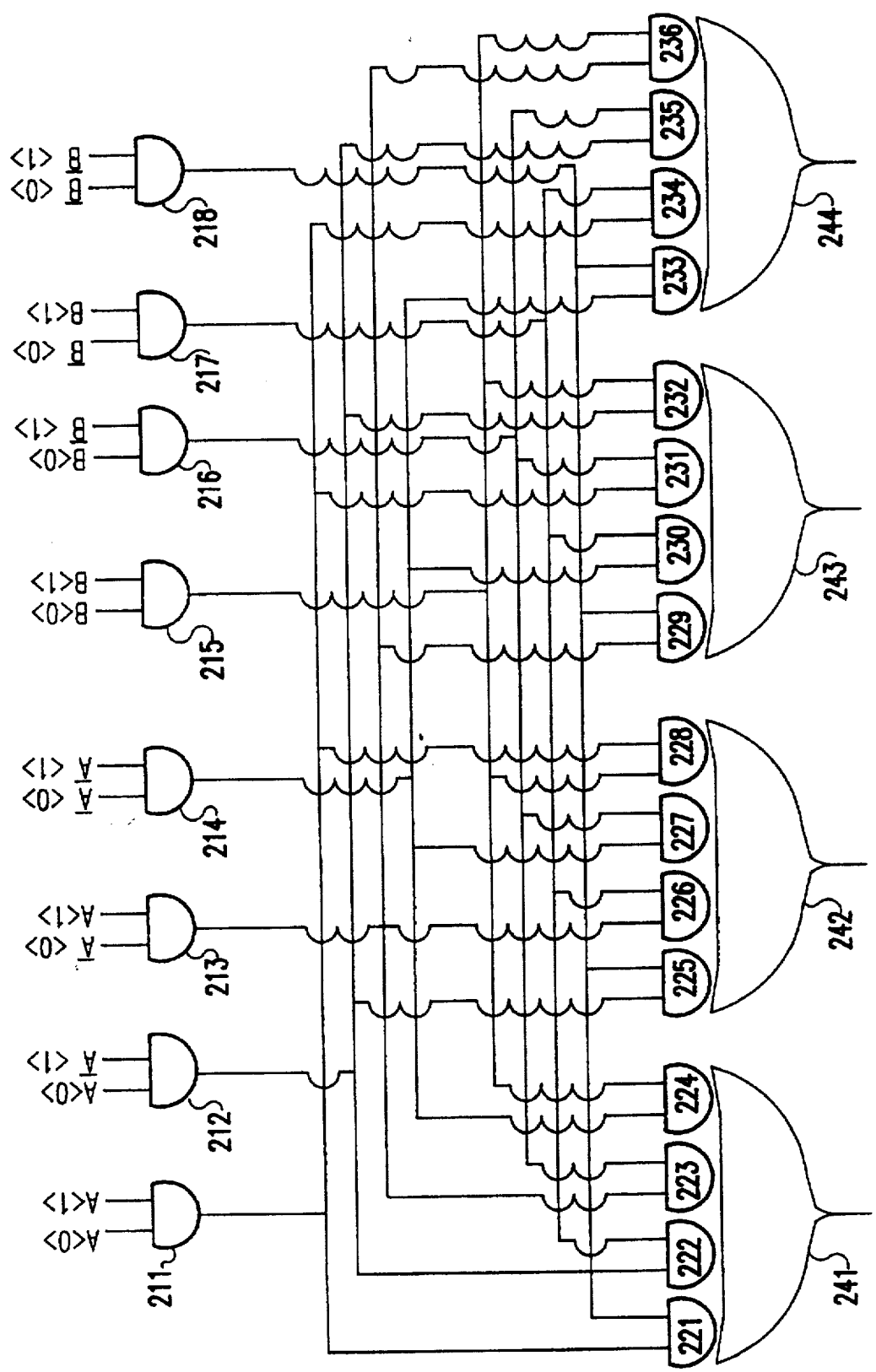
FIG. 2 is a logic diagram of a first type of the blocks of the add/decode logic shown in FIG. 1.

The Block A logic 11 is shown in more detail in FIG. 2. This logic comprises AND gates 211 to 218. AND gate 211 receives bits A<0> and A<1>. AND gate 212 receives bits A<0> and $\overline{A}$<1>, where $\overline{A}$<1> is the logical inverse of A<1>. The inputs to the remaining AND gates 213 to 218 are as shown in FIG. 2. The outputs of each of these AND gates are applied to shifting logic comprising four groups each of four AND gates and an OR gate, the first group of AND gates are AND gates 221 to 224, the outputs of which are input to OR gate 241, the second group being AND gates 225 to 228 and OR gate 242, the third group being AND gates 229 to 232 and OR gate 243, and the fourth group being AND gates 233 to 236 and OR gate 244. AND gate 221 receives as inputs the outputs of AND gates 211 and 218 so that the output of AND gate 221 is A<0> AND A<1> AND $\overline{B}$<0> AND $\overline{B}$<1>.

As an example, assume that A is binary 01 (decimal 1) and B is binary 10 (decimal 2). This produces logical "1" outputs at AND gates 213 and 216. The outputs of the other AND gates 211, 212, 214, 215, 217, and 218 are all logical "0", corresponding to the decoded outputs 0010 for A and 0100 for B. The two outputs from AND gates 213 and 216 are combined in AND gate 223 to produce a logical "1" output at OR gate 241. The output for Block A logic is then 1000 (decimal 3) which is the required decoded and summed output created by shifting 0010 to the left by two places. Thus, the logic of FIG. 2 performs the function of decoding the two-bit numbers into one-of-four signal format with the parts of operands A and B added by using one decoded input in the group to shift the other. Note that if an active bit shift beyond the left most position is required, then the active bit re-enters the shifter logic in the right most position; i.e., shifting is performed circularly. Thus, in Block A logic for the most significant bits, modulo arithmetic is performed.

Figure 3:
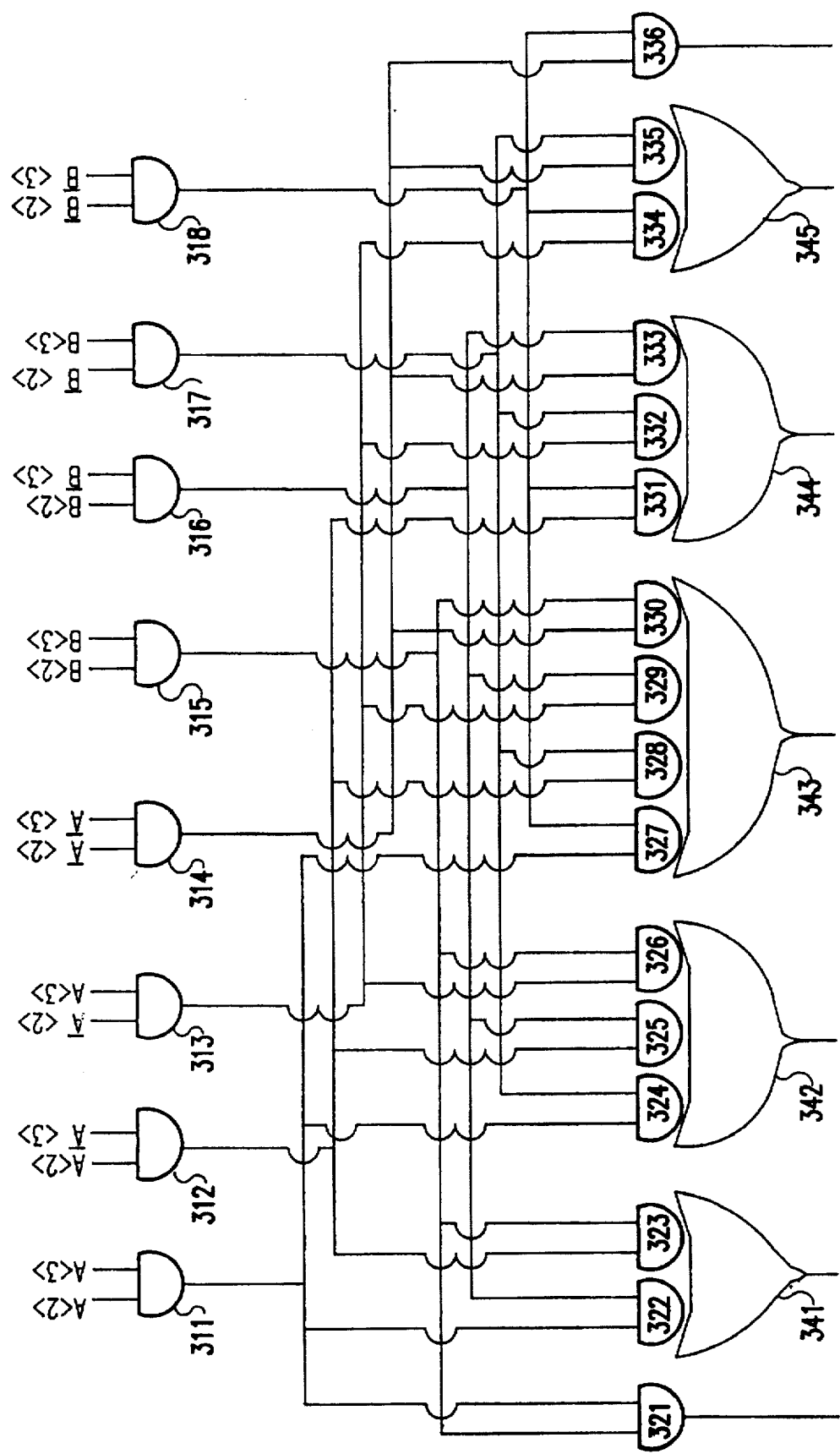
FIG. 3 is a logic diagram of a second type of the blocks of the add/decode logic shown in FIG. 1.

The Block B logic 12 is shown in more detail in FIG. 3. Since the Block B logic 13 is substantially the same as that of the Block B logic 12, the Block B logic 13 is not separately illustrated. In FIG. 3, there are again eight input AND gates, here denoted 311 to 318. Their inputs logically correspond to the inputs of AND gates 211 to 218. Thus, for example, AND gate 311 has as inputs A<2> and A<3>, and AND gate 312 has as inputs A<2> and $\overline{A}$<3>. The shifting logic differs from that of FIG. 2. This shifting logic provides a one-out-of-seven signals output and comprises AND gate 321 providing a first output, AND gates 322 and 323 and OR gate 341 providing a second output, AND gates 324 to 326 and OR gate 342 providing a third output, AND gates 327 to 330 and OR gate 343 providing a fourth output, AND gates 331 to 333 and OR gate 344 providing a fifth output, AND gates 334 and 335 and OR gate 345 providing a sixth output, and AND gate 336 providing a seventh output. AND gate 321, for example, receives inputs from AND gates 311 and 325 and provides as its output A<2> AND A<3> AND B<2> AND B<3>.

Assume that the two bits of A are 01 (decimal 1) and the two bits of B are 11 (decimal 3). This combination produces outputs at AND gates 313 and 315 (decoded outputs 0010 and 1000, respectively). These are combined in AND gate 326 to produce an output at OR gate 342. The output of Block B logic is then 0010000 or decimal 4 and is created by shifting 0010 to the left by three places. Thus, the logic of FIG. 3 also performs the function of decoding the two-bit numbers into one-of-four signal format (AND gates 311 to 318) with the parts of operands A and B added by using one decoded input in the group to shift the other but in this case, the shifter is extended so that the output conveys whether a carry is generated in this group. In the example given, the carry is generated at the output of OR gate 342. The correction of the sum produced by Block A logic 11 for a carry generated in Block B logic 12 is accomplished by Block C logic 14. Block C logic 14 also continues the decoding process.

Figure 4:
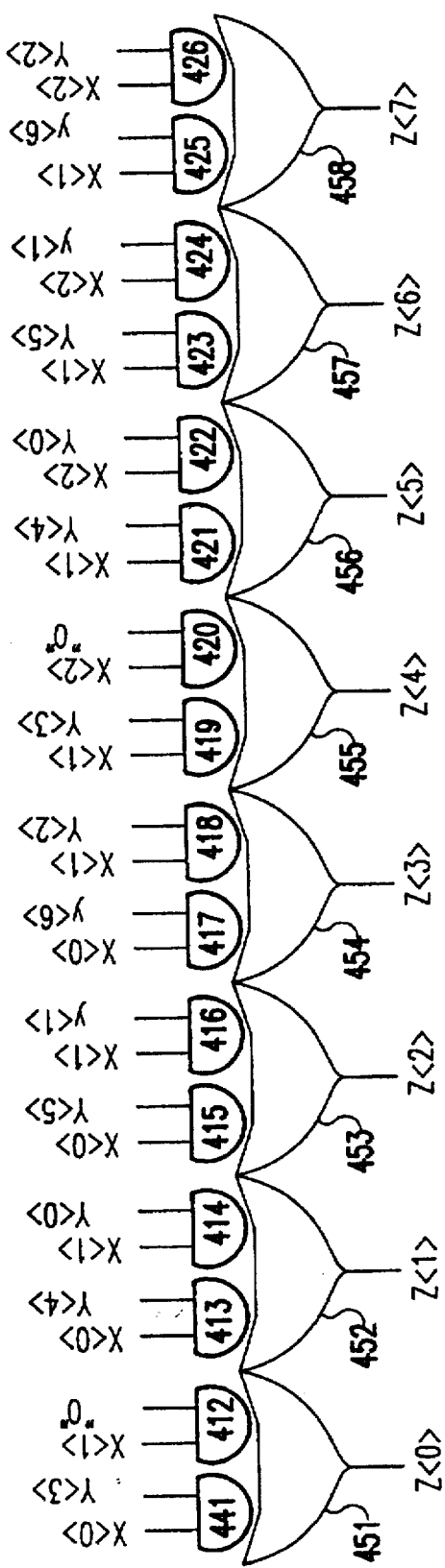
FIG. 4 is a logic diagram of a third type of the blocks of the add/decode logic shown in FIG. 1.
Figure 4:
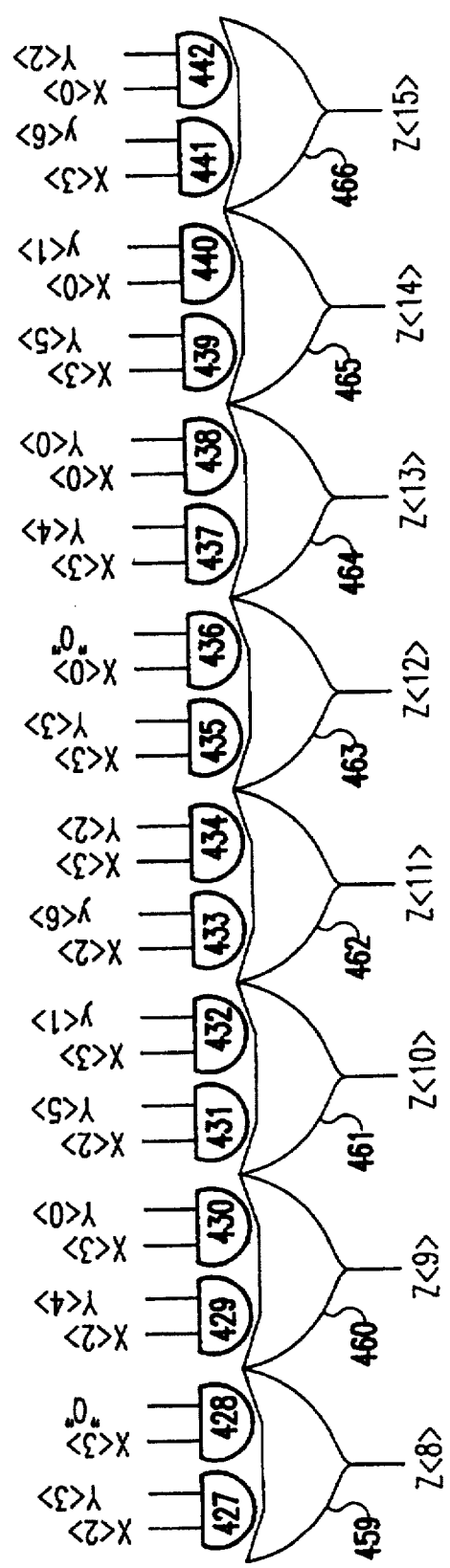

Block C logic 14 is shown in more detail in FIG. 4. Since the Block C logic 15 is similar, only being four times wider, the Block C logic 15 is not illustrated. Block C logic 14 simultaneously corrects the output of Block A logic for a carry generated in Block B logic and continues the decoding process. The Block C logic 14 shown in FIG. 4 is basically decoder logic comprising sixteen pairs of AND gates input to corresponding OR gates. The four inputs from Block A logic 11 are denoted here as X<0:3>, while the seven inputs from Block B logic 12 are denoted here as Y<0:6>. These inputs provide sixteen outputs Z<0:15>. The sixteen odd-numbered AND gates combine X<0:3> with the lower half of input Y (Y<3..6>) to constitute a decoder for the case of no carry from Block B logic 12. The sixteen even numbered AND gates combine the permuted bits X<1>, X<2>, X<3>, X<0> with four bits formed by concatenating "0" and Y<0..2> to constitute a decoder for the case of a carry generated in block B logic 12. OR gates 451 to 466 combine these two decoders.

Thus, for example, the output Z<0> of the first pair of AND gates 411 and 412 combined in OR gate 451 is X<0> AND Y<3> OR X<1> AND "0", and the output Z<1> of the second pair of AND gates 413 and 414 combined in OR gate 452 is X<0> AND Y<4> OR X<1> AND Y<0>. The final combination of the three one-of-four signal groups produced in logic blocks 11, 12 and 13 and correction of the decoded sum of A<0..3> and B<0..3> given by Z<0..15> for a carry generated in Block B logic 12, and is accomplished in Block C logic 15 to generate the one-of-sixty-four decoded form of the sum of the two 6-bit input operands A and B.

As an example to illustrate the operation of Block A logic 11, Block B logic 12 and Block C logic 14, consider two 4-bit operands as follows:

| Input | decimal | binary |
|---|---|---|
| A<0 ... 3> | 3 | 0011 |
| B<0 ... 3> | 7 | 0111 |

The sum<0..3> of A and B is 10 (decimal) or 1010 (binary). In decoded form, the sum is 0000 0100 0000 0000.

For Block A logic 11, A<0,1>=00 and B<0,1>=01. The outputs of AND gates 211 to 214, respectively, are 0001, which is the decoded form of 00 (binary), and the outputs of AND gates 215 to 218, respectively, are 0010, which is the decoded form of 01 (binary). The outputs of AND gates 221 to 224, respectively, are 0000, of AND gates 225 to 228, respectively, are 0000, of AND gates 229 to 232, respectively, are 0100, and of AND gates 233 to 236, respectively, are 0000. The output of OR gates 241 to 244, respectively, are therefore 0010. This is the decoded form for 01 (binary) or 1 (decimal), which is the sum of the inputs A<0,1> and B<0,1>. It is created by shifting 0010 by zero.

For Block B logic 12, A<0,1>=11 and B<0,1>=11. Note that summing these two generates a carry. Outputs of AND gates 311 to 314, respectively, are 1000, which is the decoded form of 11 (binary). Outputs of AND gates 315 to 318, respectively are 1000. Outputs of AND gate 321 is 1, outputs of AND gates 322 and 323, respectively, are 00, outputs of AND gates 324 to 326, respectively are 000, outputs of AND gates 331 to 333, respectively, are 000, outputs of AND gates 334 and 335, respectively, are 00, and the output of AND gate 336 is 0. Thus, the outputs of AND gate 321, OR gates 341 to 345 and AND gate 336, respectively, are 100 0000. This is the decoded form of 110 (binary) or 6 (decimal). It is created by shifting 1000 left by three places.

For Block C logic 14, input X<0..3> is the output of Block A logic 11 or 0010, and input Y<0..6> is the output of Block B logic 12 or 100 0000. Of the AND gates 411 to 442, only the AND gate with inputs X<2> and Y<0> will have a logical "1" output. This is AND gate 422. All others produce a "0" output. The output of OR gates 451 to 466, which is Z<0..15> is then 0000 0100 0000 0000. This is the decoded form of 1010 (binary) or 10 (decimal), which is the result of adding 3 (decimal) and 7 (decimal).

The above example does not include Block B logic 13 and Block C logic 15 in order to simplify the explanation. However, those skilled in the art will recognize that the extension to include these blocks is simple, if somewhat tedious.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A combined adder/decoder circuit which combines the functions of addition and decoding, comprising:

a first decoder logic circuit for decoding a group of N binary bits of a first operand to a first one-out-of-2N output;

a second decoder logic circuit for decoding a group of N binary bits of a second operand to a second one-out-of-2N output; and a shifter logic circuit for receiving said first one-out-of-2N output and shifting an active bit position of said first one-out-of-2N output left by a number of positions according to said second one-out-of-2N output thereby generating a decoded and summed one-out-of-2N output of said first and second operands, wherein said first and second operands are divided into several subgroups of a few adjacent bits and said first and second decoder logic circuits and said shifter logic circuit are divided into a tree-based decoder in which subgroups are decoded and added in a merged shifting and decoding operation, subgroups are divided from most significant bits to least significant bits and the shifter logic circuit of each subgroup, except for the most significant bits subgroup, is extended so that circular shifting does not occur in the event of a carry within in the subgroup, decoded and added subgroups are combined to generate said decoded and summed output of said first and second operands.

2. The combined adder/decoder circuit recited in claim 1 wherein N is 6 and comprises three subgroups of 2-bits each, each of said three subgroups comprising said first decoder logic circuit, said second decoder logic circuit, and said shifter logic circuit said combined adder/decoder circuit further comprising logic for combining outputs of said first decoder logic circuit and second decoder logic circuit and said shifter logic circuit to generate said decoded and summed one-out-of-$2^N$ output.

3. The combined adder/decoder circuit recited in claim 2 wherein a first subgroup of said three subgroups comprises:

a first group of four AND gates for producing a decoded output for the two most significant bits of said first operand;

a second group of four AND gates for producing a decoded output for the two most significant bits of said second operand; and four groups each comprising four AND gates and an OR gate for receiving outputs of each of the four AND gates in the group, said AND gates of each group receiving selected outputs of the first and second group of AND gates and the OR gates of the four groups collectively generating an output representing a left shifting of an active bit of the decoded output of the first group of AND gates a number of positions represented by the decoded output of the second group of AND gates.

4. The combined adder/decoder circuit recited in claim 3 wherein each of a second and third of said three subgroups, comprise:

a first group of four AND gates for producing a decoded output for two bits of said first operand;

a second group of four AND gates for producing a decoded output for two bits of said second operand; and seven groups of AND gates divided into groups of one, two, three, four, three, two, and one AND gates, said groups comprising two, three, and four AND gates further comprising an OR gate for combining outputs of said AND gates, said AND gates of each group receiving selected outputs of the first and second group of AND gates and the groups of one AND gate each and the OR gates collectively generating an output representing a left shifting of an active bit of the decoded output of the first group of AND gates a number of positions represented by the decoded output of the second group of AND gates.

* * * * *